(12) United States Patent
Chang et al.

(10) Patent No.: US 10,923,709 B2
(45) Date of Patent: Feb. 16, 2021

(54) METHODS AND SYSTEMS FOR MAKING AN ELECTRODE FREE FROM A POLYMER BINDER

(71) Applicant: CHANGS ASCENDING ENTERPRISE CO., LTD, Taichung (TW)

(72) Inventors: Chun-Chieh Chang, Ithaca, NY (US); Tsun Yu Chang, Taichung (TW)

(73) Assignee: Changs Ascending Enterprise, Co., Ltd., Taichung (TW)

( * ) Notice: Subject to any disclaimer, the term of this patent is extended or adjusted under 35 U.S.C. 154(b) by 0 days.

(21) Appl. No.: 15/151,036

(22) Filed: May 10, 2016

(65) Prior Publication Data

US 2017/0125792 A1     May 4, 2017

Related U.S. Application Data

(62) Division of application No. 13/865,962, filed on Apr. 18, 2013, now Pat. No. 9,343,743.

(51) Int. Cl.
*H01M 8/06* (2016.01)
*H01M 4/13* (2010.01)
(Continued)

(52) U.S. Cl.
CPC ............. *H01M 4/131* (2013.01); *C01B 25/45* (2013.01); *H01M 4/136* (2013.01);
(Continued)

(58) Field of Classification Search
None
See application file for complete search history.

(56) References Cited

U.S. PATENT DOCUMENTS 5,013,535 A     5/1991  Bedard et al.
8,080,338 B2 * 12/2011  Gozdz ..................... H01M 4/13
                                                429/221
(Continued)

FOREIGN PATENT DOCUMENTS

CN      102479952 A    5/2012
JP      2003272610 A   9/2003
(Continued)

OTHER PUBLICATIONS

Translation of Official Letter from the Taiwan Patent Office for application No. 103112553 dated May 10, 2016.
(Continued)

*Primary Examiner* — Cynthia H Kelly
(74) *Attorney, Agent, or Firm* — Thomas|Horstemeyer, LLP

(57) ABSTRACT

The disclosure describes an exemplary binding layer formed on Aluminum (Al) substrate that binds the substrate with a coated material. Additionally, an extended form of the binding layer is described. By making a solution containing Al-transition metal elements-P—O, the solution can be used in slurry making (the slurry contains active materials) in certain embodiments. The slurry can be coated on Al substrate followed by heat treatment to form a novel electrode. Alternatively, in certain embodiments, the solution containing Al-transition metal elements-P—O can be mixed with active material powder, after heat treatment, to form new powder particles bound by the binder.

10 Claims, 4 Drawing Sheets

(51) Int. Cl.
  *H01M 4/58* (2010.01)
  *H01M 4/64* (2006.01)
  *H01M 4/72* (2006.01)
  *H01M 4/131* (2010.01)
  *H01M 4/62* (2006.01)
  *C01B 25/45* (2006.01)
  *H01M 4/1391* (2010.01)
  *H01M 4/66* (2006.01)
  *H01M 4/1397* (2010.01)
  *H01M 4/136* (2010.01)
  *H01M 4/36* (2006.01)
  *H01M 4/505* (2010.01)
  *H01M 4/525* (2010.01)
  *H01M 10/0525* (2010.01)
  *H01M 4/04* (2006.01)

(52) U.S. Cl.
  CPC ....... *H01M 4/1391* (2013.01); *H01M 4/1397* (2013.01); *H01M 4/364* (2013.01); *H01M 4/505* (2013.01); *H01M 4/525* (2013.01); *H01M 4/58* (2013.01); *H01M 4/621* (2013.01); *H01M 4/661* (2013.01); *H01M 4/667* (2013.01); *H01M 10/0525* (2013.01); *H01M 4/0404* (2013.01); *H01M 4/0471* (2013.01); *H01M 4/366* (2013.01); *Y02E 60/10* (2013.01); *Y02P 70/50* (2015.11)

(56) References Cited

U.S. PATENT DOCUMENTS

| | | | | |
|---|---|---|---|---|
| 2001/0028980 | A1* | 10/2001 | Yoshimura | H01M 4/40 429/231.95 |
| 2007/0292759 | A1 | 12/2007 | Ugaji et al. | |
| 2008/0032197 | A1* | 2/2008 | Horpel | H01M 2/166 429/224 |
| 2011/0117432 | A1* | 5/2011 | Kay | H01M 10/0525 429/218.1 |
| 2014/0186704 | A1 | 7/2014 | Junichi et al. | |

FOREIGN PATENT DOCUMENTS

| | | |
|---|---|---|
| JP | 2012049109 A | 3/2012 |
| JP | 5255097 B2 | 8/2013 |
| WO | 2012039687 A1 | 3/2012 |
| WO | 2013034821 A1 | 3/2013 |

OTHER PUBLICATIONS

International Search Report and Written Opinion for PCT/IB2014/001065 dated Mar. 2, 2015.
S. K. Martha, et al., "LiMnPO [sub 4] as an Advanced Cathode Material for Rechargeable Lithium Batteries", Journal of the Electrochemical Society, vol. 156, No. 7, Jan. 1, 2009 (Jan. 1, 2009), pp. A541-A552.
English Translation of the Abstract for WO 2013/034821 filed Mar. 14, 2013.
Japanese Notice of Reasons for Rejection for application 2017-524126 dated Feb. 27, 2018.
South Korean Office Action for Application 10-2017-7005222 dated May 31, 2018.
Chinese Patent Office Action for application No. CN 201480080791 1 dated Oct. 22, 2018.
Chinese Office Action for 2014800807911 dated Jul. 10, 2019.
Chinese Office Action for application No. 2014800807911 dated Jan. 3, 2020.
European Office Action for 14 767 072.3 dated Mar. 6, 2019.
European Action for application No. 14767072.3-1108 dated Oct. 1, 2020.

\* cited by examiner

METHODS AND SYSTEMS FOR MAKING AN ELECTRODE FREE FROM A POLYMER BINDER

CROSS-REFERENCE TO RELATED APPLICATIONS

This application is a divisional of, and claims priority to, co-pending U.S. patent application entitled "METHODS AND SYSTEMS FOR MAKING AN ELECTRODE FREE FROM A POLYMER BINDER," filed on Apr. 18, 2013, and assigned application Ser. No. 13/865,962, which is incorporated herein by reference in its entirety.

TECHNICAL FIELD

The present disclosure is generally concerned with processing techniques for materials synthesis for lithium ion batteries.

BACKGROUND

A conventional process of making an electrode, which is a necessary part of secondary batteries, involves a step of applying a polymer binder so as to increase adhesivity between an electrode layer containing the active material and a substrate, where the polymer binder binds the substrate with the active material.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of certain embodiments of the present disclosure. Moreover, in the drawings, like reference numerals designate corresponding parts throughout the several views.

DETAILED DESCRIPTION

Disclosed herein are certain embodiments of a technique in making an electrode free from a polymer binder, such as for lithium ion battery applications. In accordance with one embodiment, good material/substrate and material's inter particle interfaces can be stabilized (bound) with the utilization of the inorganic binder containing Al, one of the transition metal elements, and phosphate ions. In certain embodiments, the transition metal element may be a combination of transition metal elements.

Since an exemplary inorganic binder may provide both bonding and electronic conducting dual characteristics, it is therefore possible to create an electrode for Li-ion batteries without both polymer binder and carbon black that may either decompose at high voltages or create unnecessary porosity (or chances in the loss of contact) of the electrode.

Figure 1:
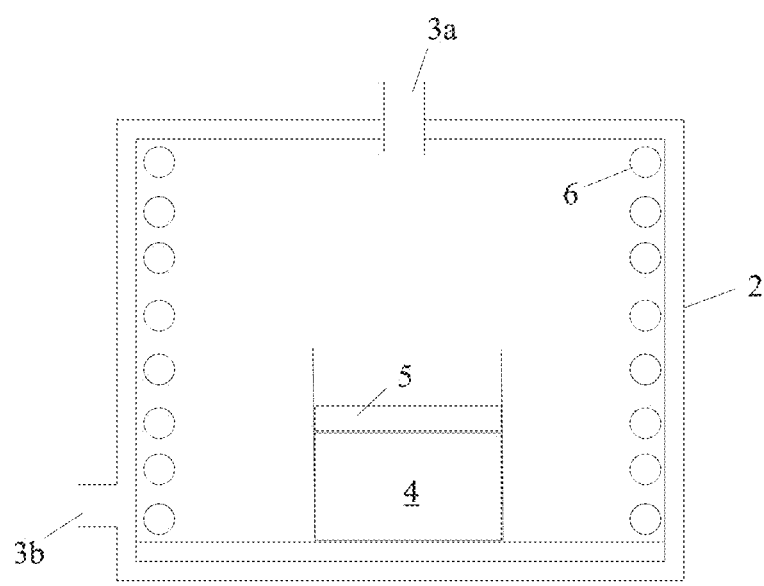
FIG. 1 is a diagram of an exemplary embodiment of a furnace and a heat treatment environment for the synthesis of electrode materials, including binder materials, in accordance with the present disclosure.

FIG. 1 shows the design of a furnace and a heat treatment environment for the synthesis of the materials presently disclosed. FIG. 1 shows reaction vessel 1, which is open to air in furnace 2. The furnace is open to the atmosphere at 3a and 3b so as to maintain substantially atmospheric pressure in the furnace. Flow of gases into or out of the furnace is dependent on heating and cooling cycles of the furnace and chemical reactions taking place with materials in the furnace. Air is free to enter the furnace, and air and/or products of a chemical reaction of materials 4 in the reaction vessel 1 are free to exit the furnace. Materials 4 in vessel 1 react chemically during heating steps to form cathode materials in accordance with the present disclosure. Materials 4 in vessel 1, which face air found in the furnace, are covered by a layer of a high temperature inert blanket 5, which is porous to air and escaping gases caused by the heating step. Heating coils of the furnace are indicated at 6.

The following are examples of exemplary techniques in accordance with embodiments of the present disclosure.

Example 1

Comparative Study of Electrodes Made with Conventional Polymer Binder and Electrodes Made Using Al—Mn—$PO_4$ Inorganic Binder This example gives a comparison between electrodes made using conventional coating process with the use of polymer binder and electrodes made following Part I and Part II below.

Part I. $LiMnPO_4$—$LiMn_2O_4$ (1.8:0.1 in molar ratio) composite material electrodes made using conventional coating process:

For electrode preparation, active material (e.g., 5 g), Super P (e.g., 1 g) and SBR (e.g., 0.3 g) was used in slurry making. After coating using doctor blade, the coated electrode was dried at 110° C. for 3 hours followed by punching of the electrode. After vacuum drying again at 110° C. for overnight, the electrodes were transferred to the glove box for test cell assembly, where the test cell is a three-electrode design with Li as the reference electrode. The electrode loading was determined to be 6 mg and the active material content was 81.3%. The C-rate used was approximately C/10 (50 uA) and the room temperature was approximately 23° C.

Figure 2A:
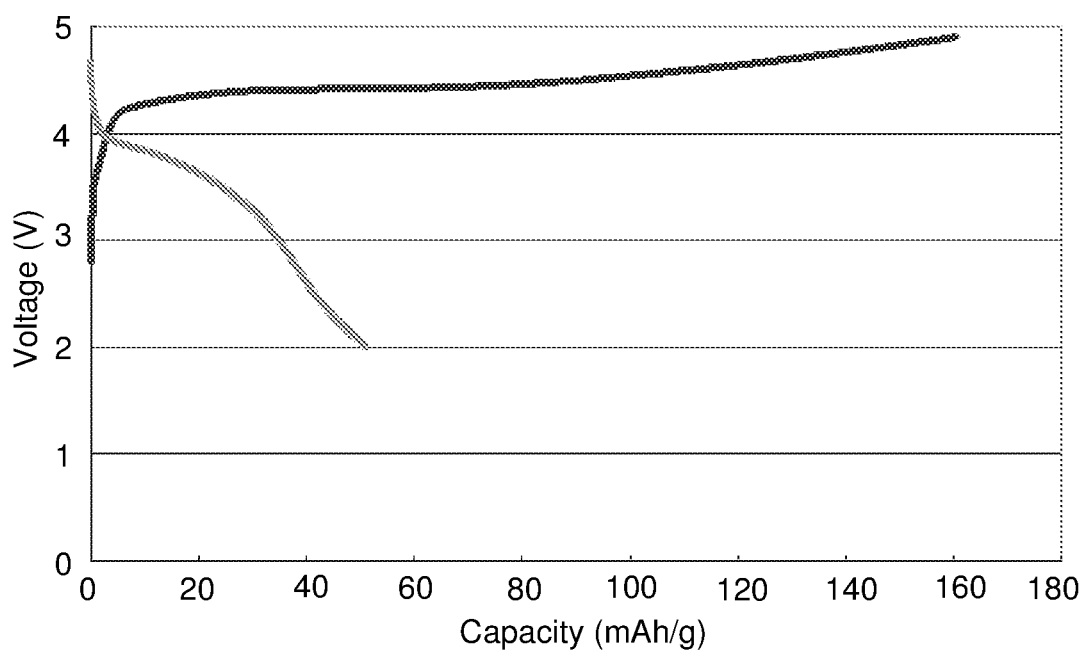
FIGS. 2(a)-2(b) are diagrams illustrating examination results for the charge capacity of synthesized electrode materials in accordance with embodiments of the present disclosure.

Referring to FIG. 2(a), a charge capacity of 160.5 mAh/g and a discharge capacity of 51 mAh/g was obtained for the prepared electrodes, after analysis. Results also indicate that the corresponding Coulomb efficiency was 31.7%. Since the test cell was charged to 4.9V, more or less decomposition of the electrolyte during charging could result in the low Coulomb efficiency.

Part II. $LiMnPO_4$—$LiMn_2O_4$ (1.8:0.1 in molar ratio) composite material electrodes made using inorganic binder:

For substrate preparation, the following steps were followed.

1. Al plate (2.67*2.67 cm, with one side covered by a polymer film) is used as the initial substrate.
2. Prepare 5M phosphorous acid/n-Butanol solution (23 g phosphorous acid diluted by n-Butanol to 40 ml in volume) as the etching solution. Warm the solution to 50° C. for later use.
3. Soak the Al plate in the 5M phosphorous acid/n-Butanol solution for 2 minutes. Follow by rinsing the Al plate in 100 ml n-Butanol for approximately 20 seconds.

4. Dry the Al plate at 60° C. in the drying oven (approximately 30 minutes).

Remarks: At this moment, Al—$PO_4$ thin film is formed as a film in white color.

5. Spread $MnO_2$ powder through 250 mesh sieve on top of the Al plate. Then, pass the as-made ($MnO_2$ coated) substrate through the calendaring machine.
6. Heat treat the as-made substrate at 330° C. for 2 hours in box furnace. After cooling, the as-made substrate is ready for battery active material loading.

Remarks: At this moment, Al—Mn—$PO_4$ thin film is formed as a film in brown color. The film is electrical conducting and can be easily examined using the volt meter.

Next, for electrode preparation, the following steps are followed.

1. The above mentioned battery active material is loaded on top of the as-made substrate by spreading the active material powder through 250 mesh sieve.
2. Pass the as-made (active material loaded) electrode through the calendaring machine again for compacting the electrode.
3. Send the as-made electrode to the box furnace and heat treat at 330° C. for 4 hours under normal air atmosphere.
4. Punch the heat treated electrode and vacuum dry the samples at 110° C. for overnight. The dried electrodes are then transferred to the glove box for test cell assembly.

Figure 2B:
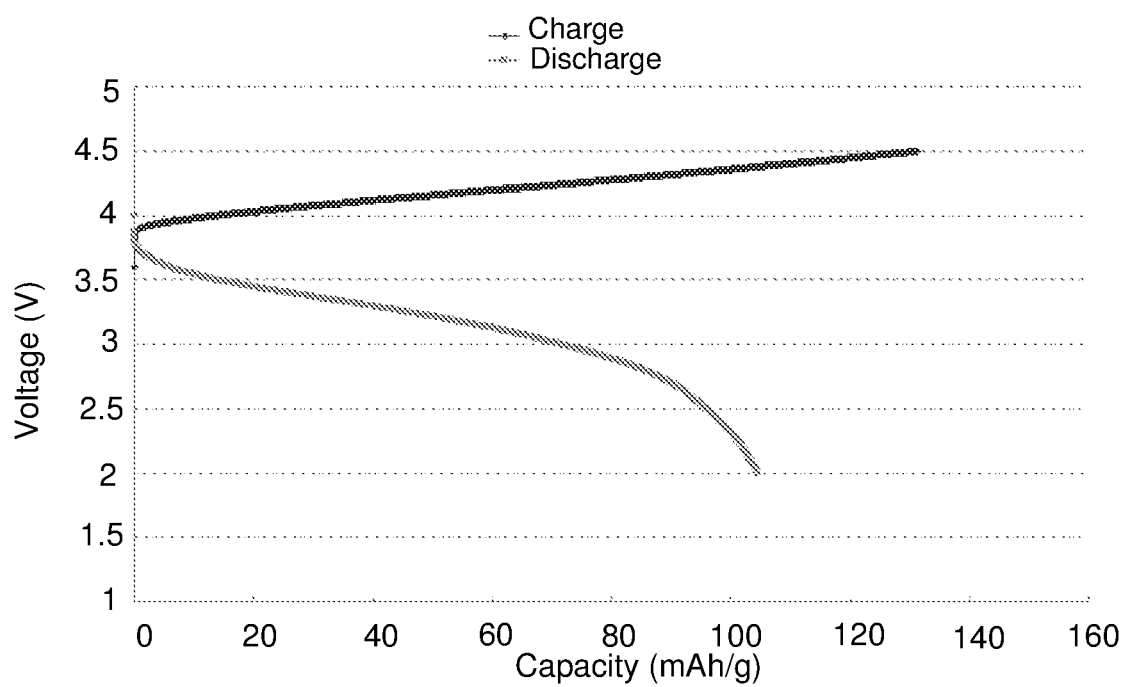

For the test cell, a three-electrode design with Li as the reference electrode was used. The electrode loading (14.6 mg) was calculated by taking the weight difference between the before active materials loading and the after heat treatment stages, then divided by the area of the substrate assuming the coating was even. The electrochemical test result is shown in FIG. 2(b). Accordingly, the C-rate used (220 uA) was around C/10 and the room temperature was around 23° C.

Further, from FIG. 2(b), a charge capacity of 131 mAh/g and a discharge capacity of 105 mAh/g was obtained. The corresponding Coulomb efficiency was indicated to be 80%. Since the test cell was charged to 4.5V only, the charge capacity is less than the data using normal coating method. However, the increase in Coulomb efficiency may suggest the possible decompositions of electrolyte and polymer binder have been minimized.

In this example, it is clear that the substrate to material interface can be improved with the use of Al—Mn—$PO_4$ film. If the Al—Mn—$PO_4$ film is not electrically conducting, the electrochemical behavior should have been deteriorated. Nonetheless, since no polymer binder and carbon black were used in the electrode making process, the decomposition reactions at high voltages have been minimized.

Example 2

Same as-Made Substrate Loaded with LFPO

In this example, the same as-made substrate (Al—Mn—$PO_4$ thin film coated) was used. The Lithium Iron Phosphorous Oxide (LFPO, U.S. Pat. Nos. 7,494,744, 7,585,593, 7,629,084, 7,718,320) material manufactured by Changs Ascending Co. Ltd. was used as the active material. Again, the material was spread on the substrate by sieving the material through the 250 mesh sieve. Then, calendaring was conducted on the as-made (active material loaded) electrode. After calendaring, the as-made electrode was subjected to heat treatment at 330° C. in air for 4 hours.

Figure 3:
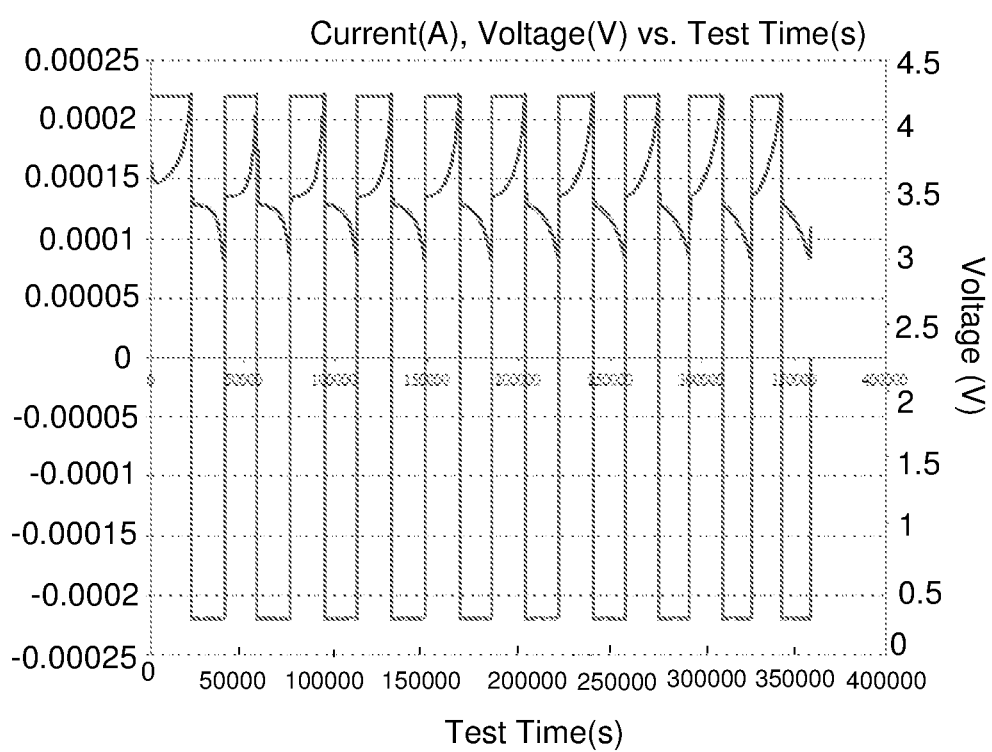
FIG. 3 is a diagram illustrating electrochemical data resulting from testing of synthesized electrode materials in accordance with embodiments of the present disclosure.

The electrochemical data is shown in FIG. 3. From the figure, it can be seen that the test cell cycled very well although the initial cell voltage was higher than normal during the first charge. It should be mentioned that no polymer binder and carbon black was used in this experiment. This experiment again demonstrates the use of Al—Mn—$PO_4$ film that allows direct bonding between the materials to the substrate with good electrical conductivity.

It is noteworthy that while spreading the active material on top of the substrate, the substrate can be wetted using either pure water (or other solvents) or very dilute polymer solutions for preventing powder drop off before calendaring. The polymer solutions, for example, can be CMC solution (Carboxylmethyl cellulose, 0.01 wt %), or SBR solution (styrene butadiene rubber solution, 0.005 wt %) but not limited to these examples. In any case, the solution containing solvent or organic molecules will be vaporized or decomposed during subsequent heat treatment. Besides, calendaring again after heat treatment is exhibiting no harm to the exemplary materials of the present disclosure.

Example 3

Inter Particle Bonding Using Solutions Containing Al—Mn—P—O

From previous examples, it was realized that the source of aluminum substrate may not be the only source of Al. Furthermore, the bonding between the material and substrate can be extended to the cases such as bonding between inter particles of the active material. Bonding between active material particles would result in the following benefits: i). Thicker active material films could result in higher volume energy density of the final battery; and ii). More reliable electrical contact between particles would lead to more consistent battery performance and thus better cycle life. A variety of different sources for Aluminum was then explored as potential solutions as discussed below.

Solution 1: Al source from pure Al foil. In this example, the source of Al was obtained by dissolving Al foil directly in phosphoric acid. In one example, dissolving 22.5 g (0.83 mole) Al foil in 230 g phosphoric acid (2 mole) resulted in a ratio of Al:P=5:12. Then, a fraction of the Al—P—O solution was utilized in dissolving manganese formate. Thus, a solution containing Al:Mn:P=5:7:12 was obtained. This solution has been utilized in making slurries containing the active materials. After coating the slurry on the Al substrate, subsequent heat treatment at 330° C. for 2 hours in oxygen or air can result in nice and firm coated film ready for lithium ion battery assembly.

Solution 2: Al source from $Al_2(SO_4)_3$. In this example, $Al_2(SO_4)_3$ (e.g., 2.14 g) (0.00625 mole) was dissolved in 15 g water. Then, $H_3PO_4$, 1.44 g (0.0125 mole) was added to the solution. Finally, manganese formate $Mn(HCOO)_2$ (e.g., 0.91 g) (0.00625 mole) was dissolved in the solution that resulted in the ratio of Al:Mn:P=1:1:2. Usually 50 g of active material (can be $LiMn_2O_4$, $Li_{1/3}Ni_{1/3}Co_{1/3}MnO_2$, LFP or LFPO) is mixed with the as-prepared solution and a slurry, or a paste, or wet powders is formed. A convenient way to make a slurry is by adding proper amount of water that can be coated on Al substrate, then followed by a heat treatment at 330° C. for 2 hours in oxygen or air. The electrode loading can be as high as 50 mg/$cm^2$ with thickness more than 200 um without showing any peel off problems.

Solution 3: Formation of $AlPO_4$. In this example, an $AlPO_4$ compound was first synthesized. After dissolving $AlPO_4$ in solvents such as water, the solution was mixed with active material. In such occasion, the transition metal source can be from trace elements in the active material. After heat treatment, still Al-Transition metal element-P—O can be present in the active material or between the active material/substrate interface. Exemplary synthesis routes for $AlPO_4$ are described below:

1. Dissolve aluminum formate in phosphoric acid (1:1 in molar ratio). Place the solution in a stainless steel crucible. Bringing the sample to 475° C. for 1 hour can result in phase pure $AlPO_4$.
2. Dissolve aluminum nitrate in phosphoric acid (1:1 in molar ratio). Place the solution in a stainless steel crucible. Bringing the sample to 500° C. for 15 minutes can result in phase pure $AlPO_4$.
3. Disperse aluminum acetate in phosphoric acid (1:1 in molar ratio). In this case, aluminum acetate cannot dissolve in phosphoric acid fully with 1:1 molar ratio. Place the solution in a stainless steel crucible. Bringing the sample to 500° C. for 20 minutes can result in a mixture of alumina and $AlPO_4$.

From Example 3, several conclusions can be made:

1. Al—Mn—P—O solution can be created in any ratio.
2. The Al—Mn—P—O solution can be incorporated in the slurry making stage and is ready for coating. Subsequent heat treatment can result in nice and firm electrode.
3. The Al—Mn—P—O solution can be incorporated in the material that results in the wet powder form. Subsequent heat treatment can bring the material back in the powder form. And, the powder can be processed using conventional coating process utilizing polymer binder and carbon black.
4. In any of the examples shown in Example 3, the inorganic binder consisting of Al-transition metal-P—O resulted in the resultant electrode or materials.

Exemplary embodiments advantageously feature a binding layer formed on Al substrate that binds the substrate with the coated material (see, e.g., example 1 and example 2). Also, exemplary embodiments disclose an extended form of the binding layer. By making a solution containing Al-transition metal elements-P—O, the solution can be used in slurry making (the slurry contains active materials). The slurry can then be coated on Al substrate followed by heat treatment to form a nice and firm electrode. Alternatively, the solution containing Al-transition metal elements-P—O can be mixed with active material powder, after heat treatment, to form new powder particles bound by the binder (see, e.g., example 3), in certain embodiments.

In one embodiment, an exemplary electrode assembly contains an Al substrate, and slurry material coating layer formed on the Al substrate, wherein the slurry material contains active material and Al-transition metal elements-P—O binder material.

Any process descriptions should be understood as representing steps in an exemplary process, and alternate implementations are included within the scope of the disclosure in which steps may be executed out of order from that shown or discussed, including substantially concurrently or in reverse order, depending on the functionality involved, as would be understood by those reasonably skilled in the art of the present disclosure.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An electrode assembly comprising:
an Al substrate of a battery electrode;
a layer of inorganic binder film over a top surface of the Al substrate, wherein the inorganic binder film is formed of Al from the Al substrate, a source of P—O elements, and at least one transition metal element; and
a layer of lithium ion battery active material over the inorganic binder film layer of the Al substrate to form the battery electrode,
wherein the inorganic binder film layer formed of the Al from the Al substrate, the source of P—O elements, and the at least one transition metal element binds the lithium ion battery active material with the Al substrate of the battery electrode, wherein the battery electrode has not been subject to a charge-discharge cycle within a lithium ion battery.

2. The electrode assembly of claim 1, wherein bonding between the inorganic binder film layer and the lithium ion battery active material comprises bonding between inter particles of the lithium ion battery active material.

3. The electrode assembly of claim 2, wherein the inorganic binder film layer is directly bonded to the Al substrate.

4. The electrode assembly of claim 1, wherein polymer binder or carbon black is not used in the electrode assembly.

5. The electrode assembly of claim 4, wherein the inorganic binder film layer contains Al—Mn—$PO_4$.

6. The electrode assembly of claim 1, wherein the inorganic binder film layer contains Al—Mn—$PO_4$.

7. The electrode assembly of claim 1, wherein the inorganic binder film layer is directly bonded to the Al substrate.

8. The electrode assembly of claim 1, wherein the transition metal element is a combination of transition metal elements.

9. The electrode assembly of claim 1, wherein the lithium ion battery active material comprises $LiMn_2O_4$, $Li_{1/3}Ni_{1/3}Co_{1/3}MnO_2$, LFP or LFPO.

10. The electrode assembly of claim 1, wherein the at least one transition metal element comprises Mn.

* * * * *